(12) United States Patent
Silverbrook

(10) Patent No.: US 7,001,012 B2
(45) Date of Patent: Feb. 21, 2006

(54) PRINTHEAD CHIP INCORPORATING A DOUBLE ACTION INK EJECTION MECHANISM

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 11/026,129

(22) Filed: Jan. 3, 2005

(65) Prior Publication Data

US 2005/0110840 A1 May 26, 2005

Related U.S. Application Data

(63) Continuation of application No. 10/303,238, filed on Nov. 23, 2002, now Pat. No. 6,874,866, which is a continuation of application No. 09/864,378, filed on May 25, 2001, now Pat. No. 6,471,336, which is a continuation-in-part of application No. 09/113,096, filed on Jul. 10, 1998, now Pat. No. 6,264,307.

(30) Foreign Application Priority Data

Jul. 15, 1997 (AU) .................................. PO7991
Jul. 15, 1997 (AU) .................................. PO8038

(51) Int. Cl.
*B41J 2/04* (2006.01)
*B41J 2/135* (2006.01)
*B41J 2/14* (2006.01)
*B41J 2/16* (2006.01)

(52) U.S. Cl. ............................ 347/54; 347/44; 347/47
(58) Field of Classification Search .................. 347/20, 347/44, 47, 54, 56, 51, 63, 65, 67; 60/527–529; 310/306–307; 337/139–141; 251/129.01–129.02, 251/129.06
See application file for complete search history.

(56) References Cited

U.S. PATENT DOCUMENTS

| 4,550,326 A | * | 10/1985 | Allen et al. .................... 347/44 |
| 5,612,723 A | | 3/1997 | Shimura et al. ............... 347/47 |
| 5,940,096 A | * | 8/1999 | Komplin et al. ............... 347/44 |
| 6,084,609 A | * | 7/2000 | Manini et al. ................. 347/47 |

FOREIGN PATENT DOCUMENTS

JP 403153359 A 7/1991

* cited by examiner

*Primary Examiner*—Juanita D. Stephens

(57) ABSTRACT

A printhead chip includes a substrate that incorporates a drive circuitry layer. A plurality of nozzle chamber structures is positioned on the substrate. Each nozzle chamber structure defines a nozzle chamber and a pair of ink ejection ports in fluid communication with the nozzle chamber. A plurality of elongate actuators is associated with respective nozzle chamber structures. Each actuator has one end fast with the substrate to be electrically connected to the drive circuitry layer and to be reciprocally displaced relative to the substrate on receipt of an electrical signal from the drive circuitry layer. An ink ejecting member is positioned in each nozzle chamber and is connected to the associated actuator to be reciprocally displaced by the actuator. The nozzle chamber structure is configured so that as the ink ejecting member is displaced in one direction, ink is ejected from one of the ink ejection ports and as the ink ejecting member is displaced in an opposite direction, ink is ejected from the other ink ejection port.

7 Claims, 7 Drawing Sheets

PRINTHEAD CHIP INCORPORATING A DOUBLE ACTION INK EJECTION MECHANISM

CROSS REFERENCED AND RELATED APPLICATIONS

This is a Continuation of 10/303,238 filed Nov. 23, 2002, now issued as U.S. Pat. No. 6,874,866, which is a continuation of U.S. Ser. No. 09/864,378 filed May 25, 2001, now issued as U.S. Pat. No. 6,471,336, which is a Continuation-In-Part of 09/113,096 filed Jul. 10, 1998, now issued as U.S. Pat. No. 6,264,307, all of which are herein incorporated by reference.

FIELD OF THE INVENTION

This invention relates to a nozzle arrangement that incorporates a reversible actuating mechanism. This invention also relates to a printhead that includes a plurality of such nozzle arrangements.

BACKGROUND OF THE INVENTION

The Applicant has invented a printhead which is capable of generating text and images at a resolution as high as 1600 dpi. In order to achieve this high resolution, the applicant has utilized various aspects of micro electromechanical systems technology. The reason for this is that such systems provide a means whereby ink can be ejected independently from a plurality of nozzle arrangements.

The nozzle arrangements are formed on a page width printhead. In order to achieve the high resolutions, up to 84000 nozzle arrangements can be formed on the page width printhead. Each of these nozzle arrangements is in the form of a micro electromechanical device that incorporates at least one working device which is displaceable to achieve or permit the ejection of ink from each nozzle arrangement.

The Applicant has found that it is often advantageous continuously to control the movement of such a working device in order that the working device can remain stable during its movement through a path of travel.

SUMMARY OF THE INVENTION

According to a first aspect of the invention, there is provided a nozzle arrangement that is the product of an integrated circuit fabrication technique, the nozzle arrangement comprising
  a substrate; and
  an actuating mechanism that is mounted on the substrate and that comprises
    a first member that is movable reciprocally along a path of travel in order to perform work; and
    at least two actuators that are arranged with respect to the first member to act on the first member, the actuators being configured so that the first member is under the influence of at least one of the actuators at substantially all points along the path of travel.

According to a second aspect of the invention there is provided a nozzle arrangement which is the product of an integrated circuit fabrication technique, the nozzle arrangement comprising
  a substrate;
  a first member that is mounted on the substrate and that is movable reciprocally along a path of travel in order to perform work, the first member being configured to be so movable under the influence of a magnetic field of suitable strength; and
  at least two electromagnetic actuators that are arranged with respect to the first member to act on the first member, the actuators being capable of generating a magnetic field and of reversing the polarity of that field, the actuators being connectable to a suitable control system to permit the actuators to act synchronously so that the first member is under the influence of said at least two actuators while being reciprocally moved along the path of travel by magnetic fields generated by said at least two actuators.

According to a third aspect of the invention, there is provided an ink jet printhead, which is the product of an integrated circuit fabrication technique, the ink jet printhead comprising
  a substrate; and
  a plurality of nozzle arrangements that are arranged on the substrate, each nozzle arrangement comprising
    nozzle chamber walls that define a nozzle chamber; and
    an actuating mechanism that is mounted on the substrate and that comprises
    a first member that is movable reciprocally along a path of travel in order to eject ink from the nozzle chamber and at least two actuators that are arranged with respect to the first member to act on the first member, the actuators being configured so that the first member is under the influence of at least one of the actuators at substantially all points along the path of travel.

In a fourth aspect, embodiments of the invention provide a nozzle arrangement comprising
  a substrate;
  an actuating mechanism that is mounted on the substrate and that comprises a first member that is movable reciprocally along a path of travel between first and second positions; and
  at least actuators that are arranged with respect to the first member to act on the first member, the actuators being configured so that the first member is under the influence of at least one of the actuators at substantially all points along the path of travel.

In a fifth aspect, embodiments of the invention provide a nozzle arrangement is comprising
  a substrate;
  a first member that is mounted on the substrate and that is movable reciprocally along a path of travel in order to perform work, the first member being configured to be so movable under the influence of a magnetic field of suitable strength; and
  at least two electromagnetic actuators that are arranged with respect to the first member to act on the first member, the actuators being capable of generating a magnetic field and of reversing the polarity of that field, the actuators being connectable to a suitable control system to permit the actuators to act synchronously so that the first member is under the influence of said at least two actuators while being reciprocally moved along the path of travel by magnetic fields generated by said at least two actuators.

In a sixth aspect, embodiments of the invention provide an inkjet printhead comprising
  a substrate; and
  a plurality of nozzle arrangements that are arranged on the substrate, each nozzle arrangement comprising
    nozzle chamber walls that define a nozzle chamber; and
    an actuating mechanism mounted on the substrate and comprises a first member that is movable reciprocally along a path of travel in order to eject ink from the nozzle chamber and at least two actuators that are arranged with respect to the first member to act on the first member, the actuators being configured so that the first member is under the influence of at least one of the actuators at substantially all points along the path of travel.

The invention is now described, by way of examples, with reference to the accompanying drawings. The specific nature of the following description should not be construed as limiting the scope of the above summary.

DETAILED DESCRIPTION OF THE DRAWINGS

Figure 1:
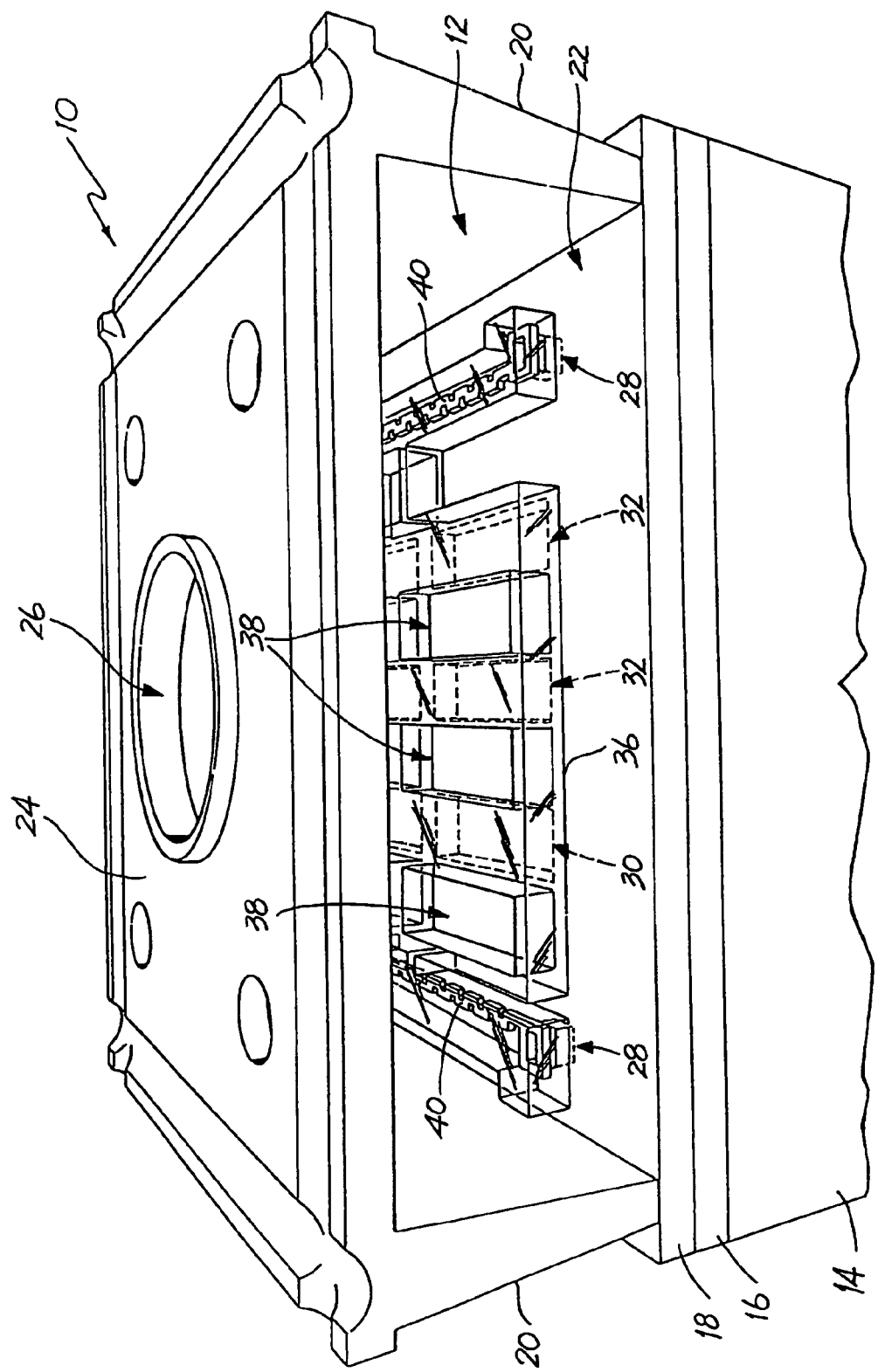
FIG. 1 shows a schematic, three dimensional view of a first embodiment of a nozzle arrangement, in accordance with the invention, for an ink jet printhead.
Figure 2:
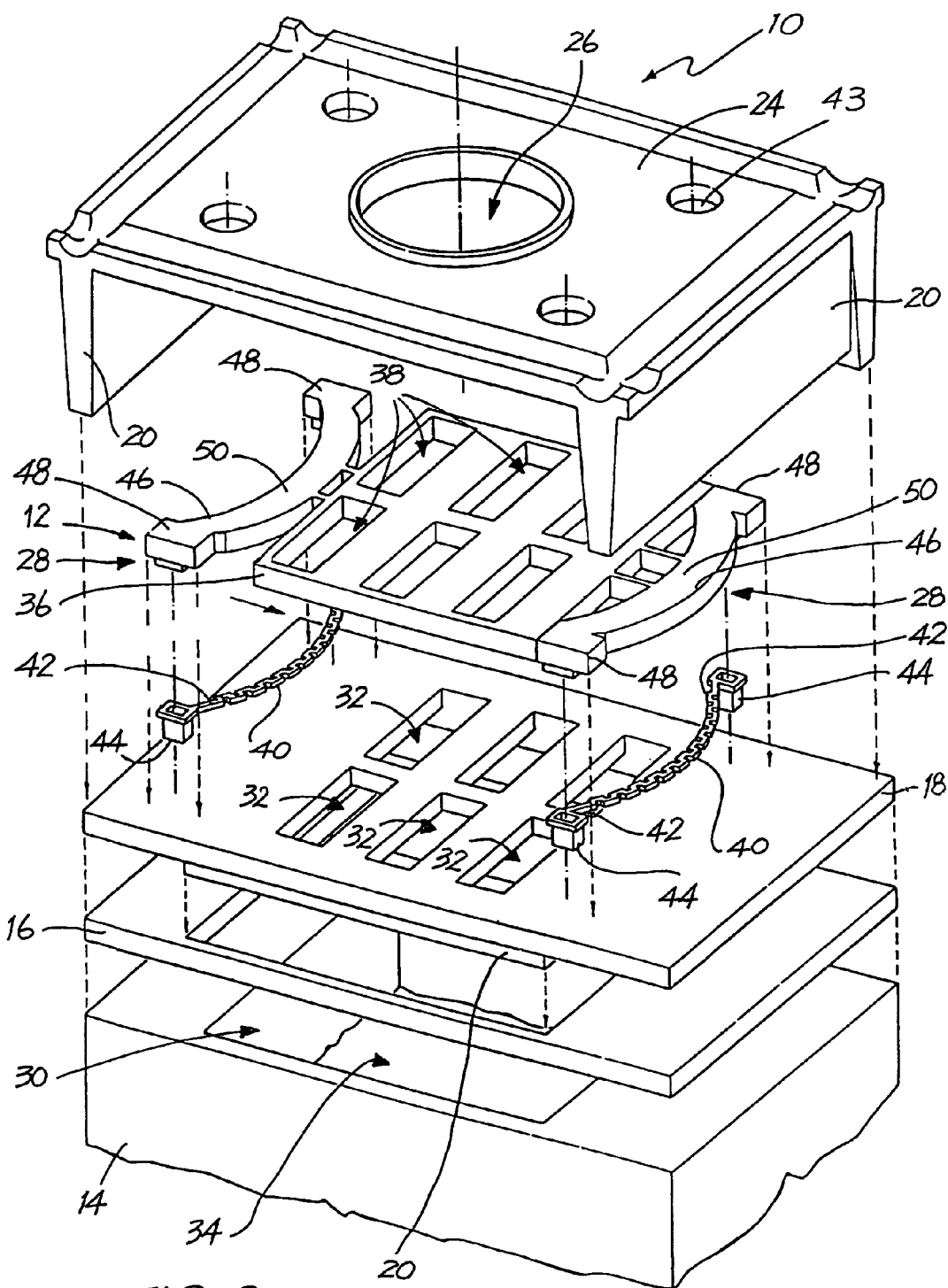
FIG. 2 shows an exploded view of the nozzle arrangement of FIG. 1.

In FIGS. 1 and 2, reference numeral 10 generally indicates a nozzle arrangement 12, in accordance with the invention, for an ink jet printhead.

The nozzle arrangement 10 is one of a plurality of nozzle arrangements formed on a wafer substrate 14 to define a page width printhead chip.

The wafer substrate 14 has a drive circuitry layer 16 positioned on the substrate 14. A passivation layer 18 is positioned on the drive circuitry layer 16.

The nozzle arrangement 10 includes nozzle chamber walls 20 formed in a deposition and etching process to define a nozzle chamber 22. A roof 24 spans the walls 20 and defines an ink ejection port 26 from which ink is ejected, in use.

An actuating mechanism 12 is positioned within the nozzle chamber 22.

The actuating mechanism 12 includes a pair of opposed actuators 28 that are mounted through the passivation layer 18 to be in electrical connection with the drive circuitry layer 16.

The actuators 28 are positioned on each side of an inlet 30 of the nozzle chamber 22. The inlet 30 is defined by a number of inlet openings 32 formed in the layers 16, 18 to be in fluid communication with an inlet channel 34 defined through the wafer substrate 14.

The actuating mechanism 12 includes a working device in the form of a shutter member 36 that is mounted between and to the actuators 28 to span the inlet 30. The shutter member 36 has a number of openings 38 defined therein. The shutter member openings 38 correspond with the inlet openings 32 with the shutter member 36 being displaceable between a closed position in which the sets of openings 32, 38 are out of register so that the inlet 30 is closed and an open position in which the openings 32, 38 are in register, thereby opening the inlet 30. The shutter member 36 is shown in its closed position in FIG. 1.

The actuators 28 are connected to the drive circuitry layer 16 which, in turn, is connected to a control system so that the actuators 28 can be activated in a substantially synchronous manner.

Each actuator 28 includes a heater element 40 connected, at ends 42 of the heater element 40, to the circuitry layer 16 at vias 44. The heater elements 40 are positioned within respective actuator arms 46. Each actuator arm 46 is of a material with a coefficient of thermal expansion that is suitably high so that, on heating, the subsequent expansion of the material is sufficient to perform work, in this case, the moving of the shutter member 36 between the open and closed positions. Ends 48 of each actuator arm 46 are fast with the layers 16, 18 while an intermediate portion 50 of each actuator arm 46 is free to move with respect to the layers 16, 18. Thus, it will be appreciated that, on expansion of the actuator arms 46, the actuator arms 46 are constrained to bend in a particular direction. In this particular example, the actuator arms 14 are pre-formed so that they each bend towards the same direction. It follows that, by ensuring that substantially identical signals are provided to the heater element 40, both actuator arms 46 will bend, in a synchronous manner, in the same direction, effectively pushing and pulling the shutter member 36 between the open and closed positions.

The actuator arms 46 and the shutter member 36 can be configured so that, prior to bending, the shutter member 36 is in its closed position.

For this purpose, the actuator arms 46 may be of a material having a suitable Young's modulus to ensure that the actuator arms act on the shutter member 36 to move the shutter member 36 back into a closed position upon cooling of the actuator arms 46.

Figure 3:
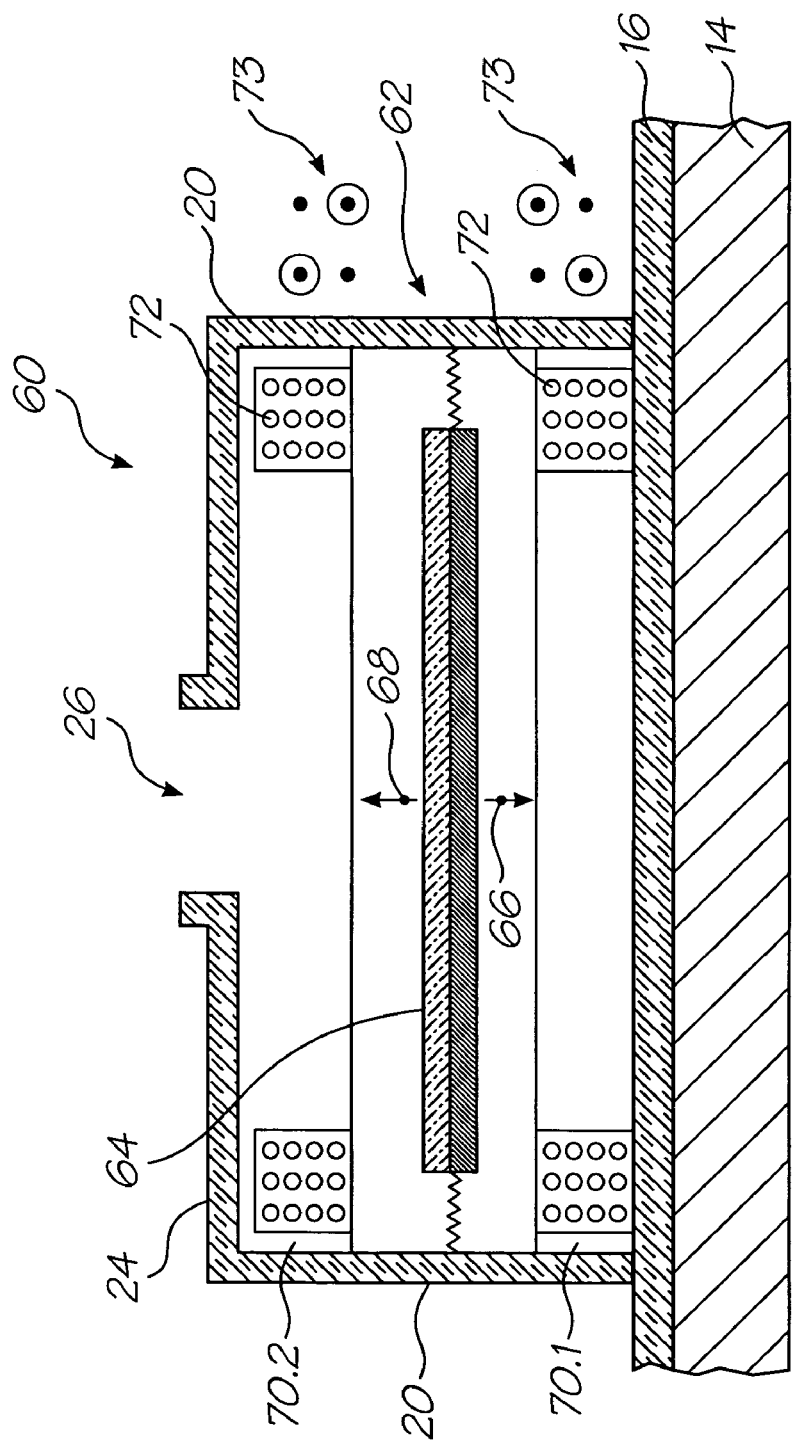
FIG. 3 shows a schematic side view of a second embodiment of a nozzle arrangement, in accordance with the invention, for an ink jet printhead.
Figure 4:
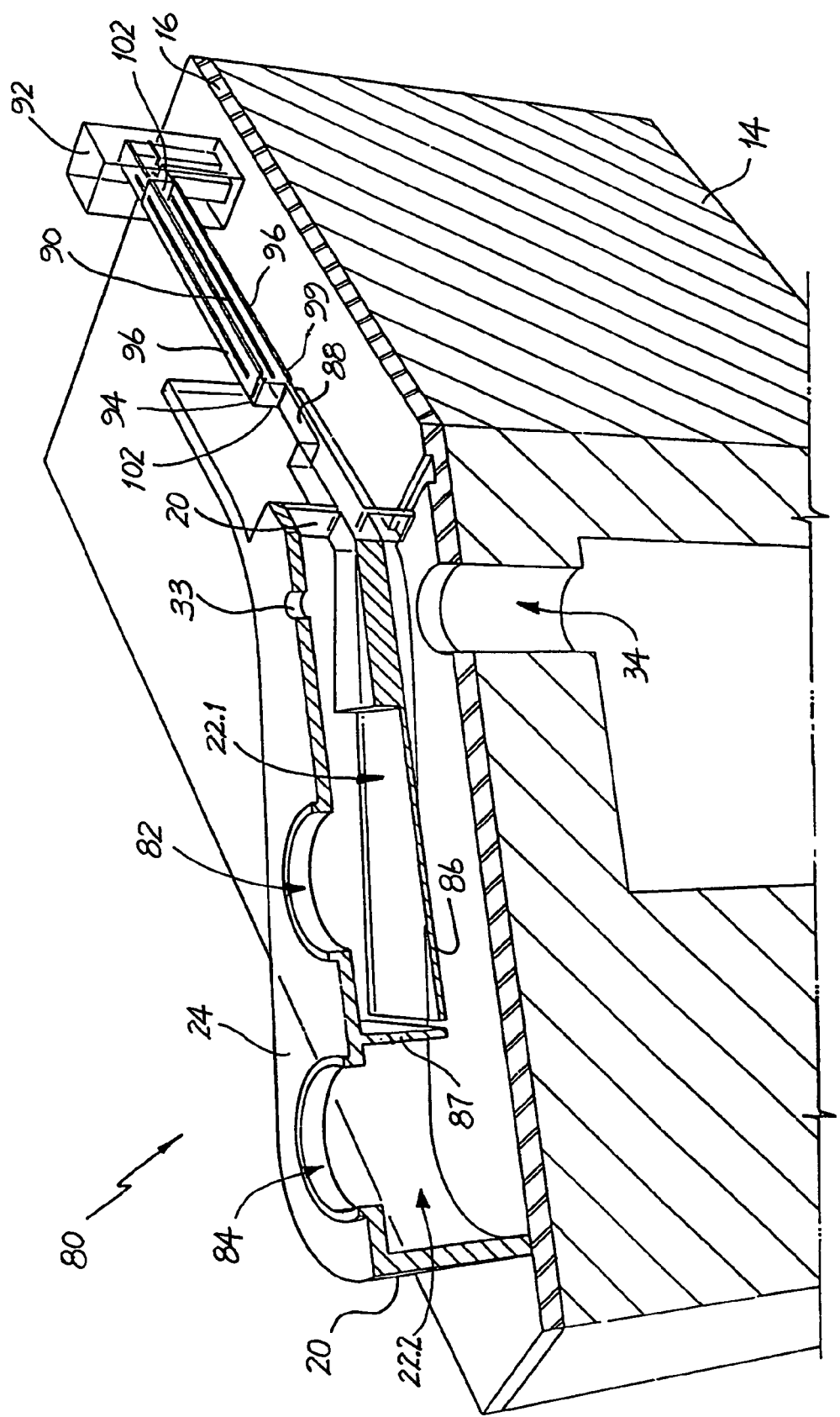
FIG. 4 shows a schematic, three dimensional view of a third embodiment of a nozzle arrangement, in accordance with the invention, for an ink jet printhead.
Figure 5:
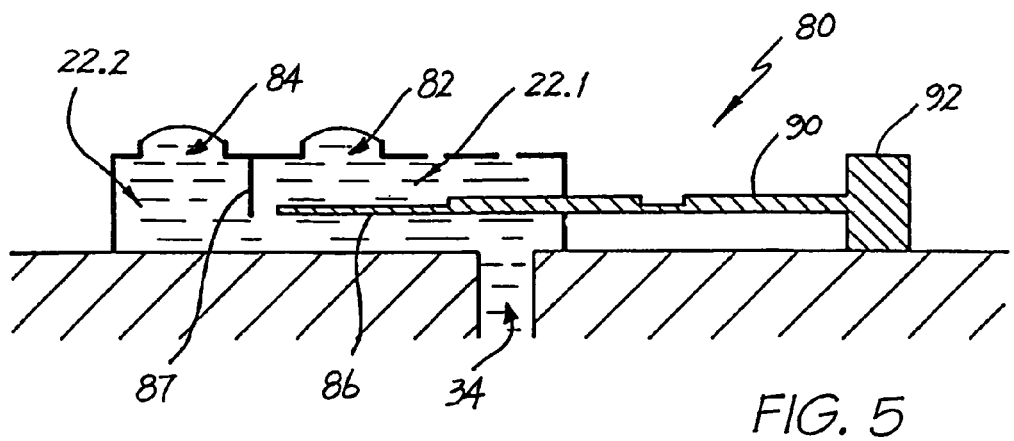
FIG. 5 shows the nozzle arrangement of FIG. 4 in an at rest condition.

In FIG. 3, reference numeral 60 generally indicates a second embodiment of a nozzle arrangement in accordance with the invention, which incorporates an actuating mechanism 62. With reference to FIGS. 1 and 2, like reference numerals refer to like parts, unless otherwise specified.

The actuating mechanism 62 includes a moving device in the form of a paddle 64 which is mounted in a displaceable manner between the nozzle chamber walls 20 to span the nozzle chamber 22. In particular, the paddle 24 is displaceable between a lowered position as indicated by the arrow 66 and a raised position as indicated by the arrow 68. The paddle 64 is configured so that, as the paddle moves from the lowered position to the raised position, ink can be ejected from the nozzle chamber 22 out of the ink ejection port 26.

The actuating mechanism 62 includes a pair of spaced toroidal magnetic field generators 70, in particular, a lower magnetic field generator 70.1 and an upper magnetic field generator 70.2. Each of the magnetic field generators 70 has a wound coil 72 which is connected to the drive circuitry layer 16. It follows, therefore, that it is to be appreciated that by having the drive circuitry layer 16 configured in a suitable manner, it is possible to create a magnetic field with either of the generators 70 of a desired polarity and even to reverse the polarities when required. This can be done simply by controlling the direction of the current through the coils 72 as indicated by the directional symbols 73.

The paddle 64 is divided into an upper portion having one of a negative and a positive polarity and a lower portion having the other of the negative and positive polarities. In particular, the paddle 64 is a permanent magnet. It follows, therefore, that with suitably strong fields being generated by the generators 70, the paddle 64 can be driven both towards and away from the ink ejection port 26 depending on the operation of the drive circuitry layer 16.

In FIGS. 4 to 9, reference numeral 80 generally indicates a third embodiment of a nozzle arrangement, in accordance with the invention. With reference to FIGS. 1 to 3, like reference numerals refer to like parts, unless otherwise specified.

The roof 24 of the nozzle arrangement 80 has two ink ejection ports 82 and 84 defined therein. The nozzle chamber 22 is divided into a first part 22.1 and a second part 22.2, by a partitioning wall 87 that depends from the roof 24. An ink ejection member in the form of a paddle 86 is pivotally mounted on one of the walls 20 to extend into the first part 22.1 of the nozzle chamber 22. The paddle 86 is pivotal towards and away from the ink ejection port 82. The nozzle chamber 22 and the paddle 86 are configured so that, as the paddle 86 is pivoted towards the ink ejection port 82, ink is ejected from the ink ejection port 82 and as the paddle 86 is pivoted away from the ink ejection port 82, ink is ejected from the ink ejection port 84.

A distal end of an effort arm 88 is connected to the paddle 86 outside of said one of the walls 20. Thus, said one of the walls 20 acts as a fulcrum with the paddle 86 defining a load arm. A proximal end of the effort arm 88 is connected to a distal end of an actuator arm 90.

The actuator arm 90 is of a resiliently flexible material such as polytetrafluoroethylene (PTFE). A proximal end of the actuator arm 90 is connected to a support post 92 which extends from the drive circuitry layer 16. The actuator arm 90 has two pairs of opposed sides 94 and 102.

A thermal actuator in the form of a heater element 96 is fixed to each of the pair of opposed sides 94 of the actuator arm 90, with one of the heater elements 96 being positioned between the substrate 14 and the actuator arm 90. Each heater element 96 is of a conductive material which expands readily as a result of resistive heating.

Figure 6:
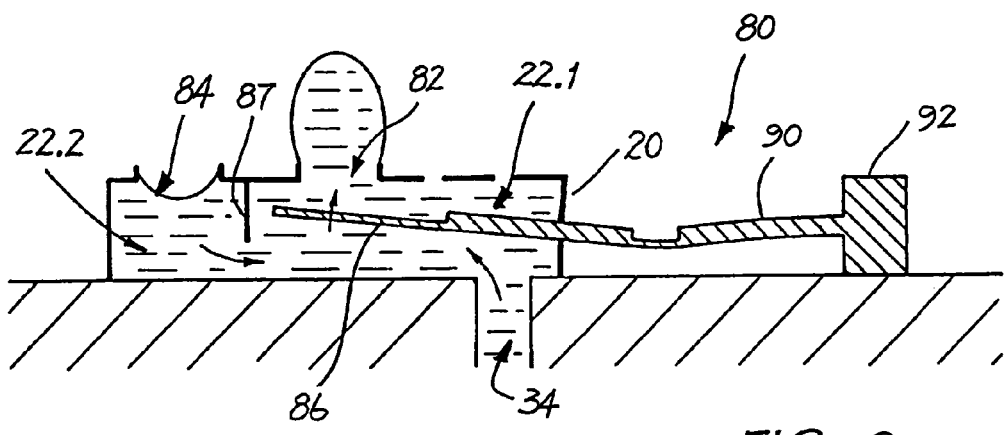
FIG. 6 shows the nozzle arrangement of FIG. 4 with one of its actuators activated.
Figure 7:
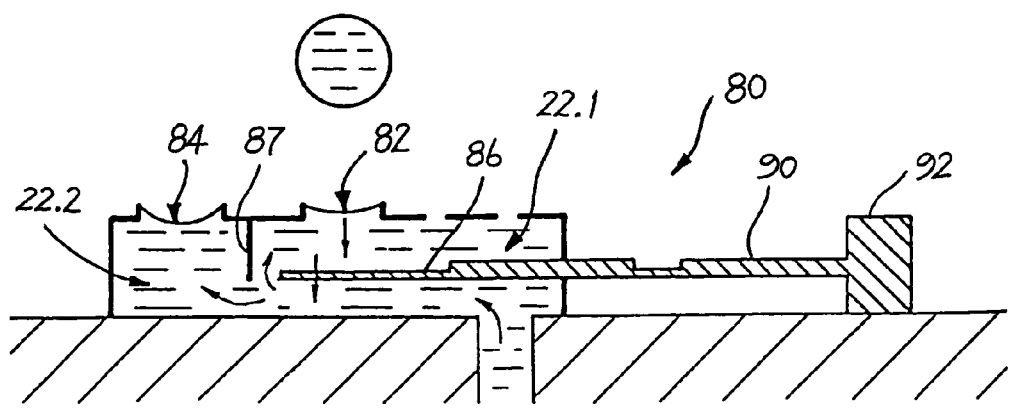
FIG. 7 shows the nozzle arrangement of FIG. 4 in a neutral condition.
Figure 8:
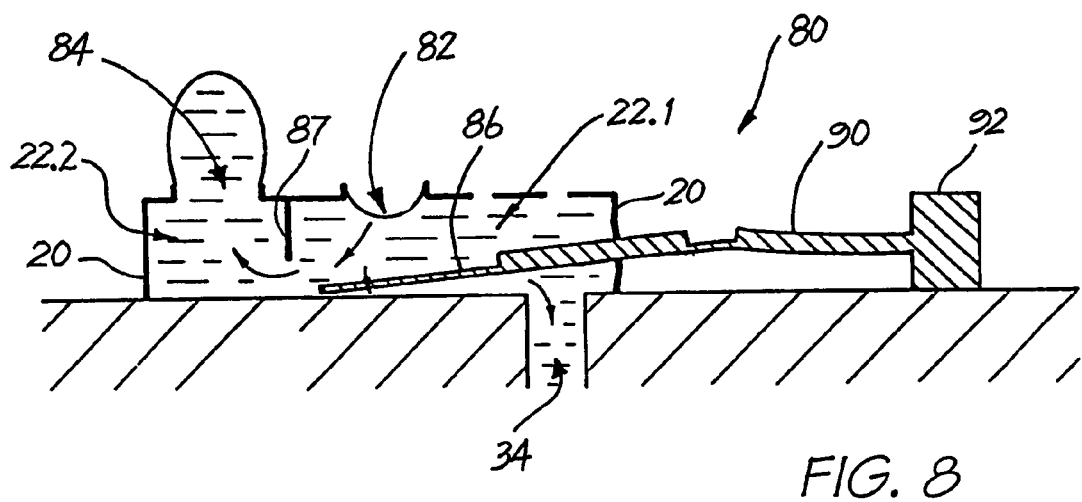
FIG. 8 shows the nozzle arrangement of FIG. 4 with another of its actuators activated.
Figure 9:
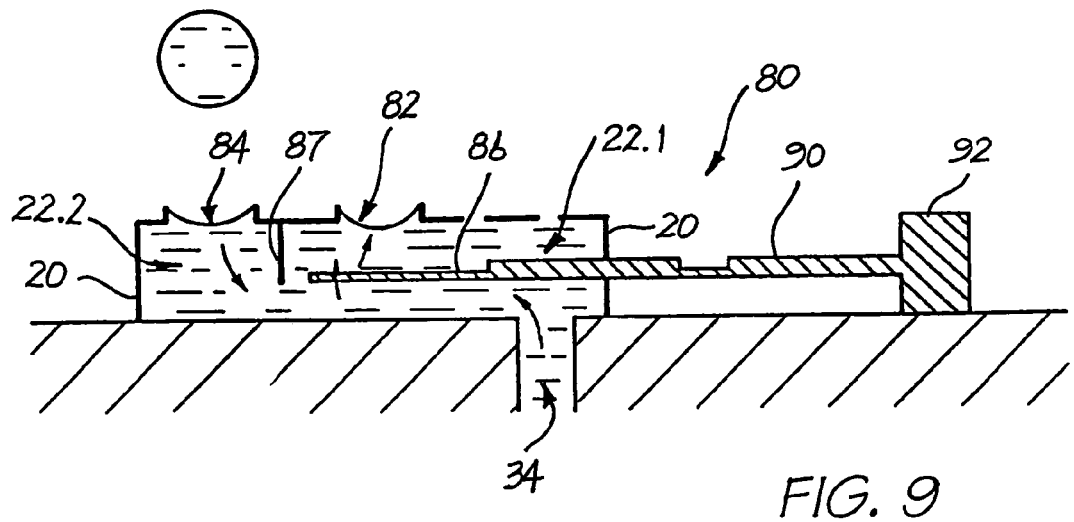
FIG. 9 shows the nozzle arrangement of FIG. 4 in a neutral condition.

Each heater element 96 is electrically connected to the drive circuitry layer 16 via the support post 92. Thus, the actuator arm 90 can be made to bend towards or away from the substrate 14, depending on which of the heater elements 96 is activated by the drive circuitry within the layer. It follows that the paddle 86 can be driven towards or away from the ink ejection port 82, depending on which of the heater elements 96 are activated. This can readily be seen in FIGS. 5 to 9. For example FIG. 6 shows a result of the heater element 96 upon the actuator arm 90 being heated, while FIG. 8 shows a result of the heater element 96 beneath the arm 90 being heated.

Figure 10:
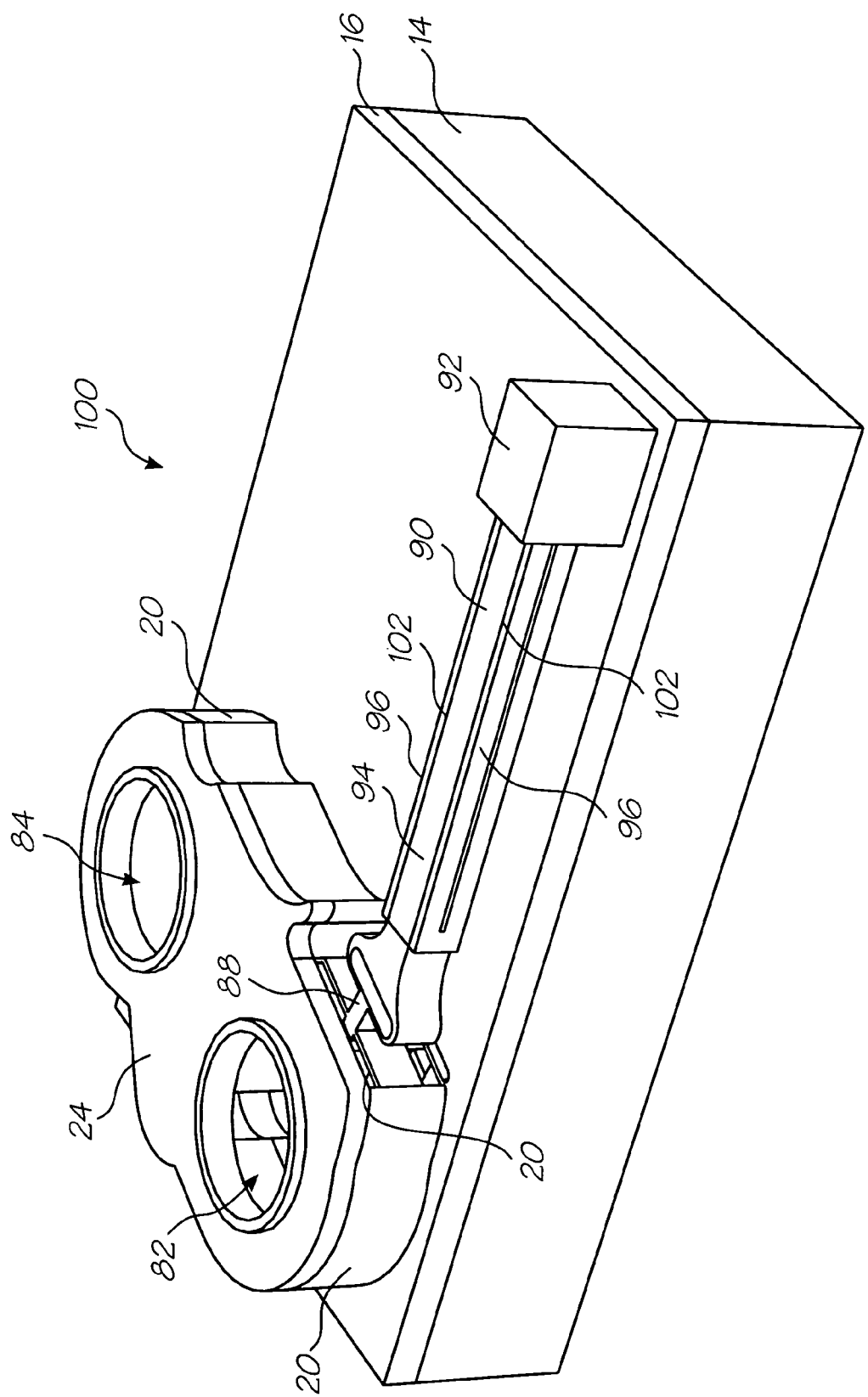
FIG. 10 shows a schematic, three dimensional view of a fourth embodiment of a nozzle arrangement, in accordance with the invention, for an ink jet printhead.

In FIG. 10, reference numeral 100 generally indicates a fourth embodiment of a nozzle arrangement, in accordance with the invention. With reference to FIGS. 1 to 9, like reference numerals refer to like parts, unless otherwise specified.

The nozzle arrangement 100 is substantially the same as the nozzle arrangement 80, for the purposes of this invention. The primary difference is that the heater elements 96 are positioned on each of the pair of opposed sides 102 so that movement of the actuator arm is in a plane substantially parallel to the substrate 14, rather than in a plane substantially normal to the substrate 14 as is the case with the nozzle arrangement 80.

Applicant believes that this invention provides a means whereby movement of an actuator in a nozzle arrangement that is the product of an integrated circuit fabrication technique can be controlled in a stable manner. This ensures consistency of operation, which is extremely important in such nozzle arrangements.

What is claimed is:

1. A printhead chip which comprises
   a substrate that incorporates a drive circuitry layer;
   a plurality of nozzle chamber structures positioned on the substrate, each nozzle chamber structure defining a nozzle chamber and a pair of ink ejection ports in fluid communication with the nozzle chamber;
   a plurality of elongate actuators associated with respective nozzle chamber structures, each actuator having one end fast with the substrate to be electrically connected to the drive circuitry layer and to be reciprocally displaced relative to the substrate on receipt of an electrical signal from the drive circuitry layer; and
   an ink ejecting member positioned in each nozzle chamber and connected to the associated actuator to be reciprocally displaced by the actuator, the nozzle chamber structure being configured so that as the ink ejecting member is displaced in one direction, ink is ejected from one of the ink ejection ports and as the ink ejecting member is displaced in an opposite direction, ink is ejected from the other ink ejection port.

2. A printhead chip as claimed in claim 1, in which each actuator comprises an actuator arm of a material capable of thermal expansion to perform work that is anchored to the substrate at one end and a pair of heater elements fast with the actuator arm on respective opposite sides of the arm and connected to the drive circuitry layer to receive alternate heating currents so that the arm experiences alternate thermal differential expansion and is thus reciprocally displaced.

3. A printhead chip as claimed in claim 2, in which the heater elements are substantially identical.

4. A printhead chip as claimed in claim 2, in which one of the heater elements is interposed between the actuator arm and the substrate and the arm is interposed between the heater elements so that the arm is displaced reciprocally towards and away from the substrate.

5. A printhead chip as claimed in claim 4, in which each nozzle chamber structure includes a nozzle chamber wall and a roof that defines the nozzle chamber, each arm being connected to the respective ink ejecting member at the wall, such that the wall acts as a fulcrum, the actuator arm defining an effort member and the ink ejecting member defining a working member.

6. A printhead chip as claimed in claim 4, in which each nozzle chamber structure includes a partitioning wall that depends from the roof, between the ink ejection ports so that each nozzle chamber is divided into a first part in fluid communication with one of the ink ejection ports and a second part in fluid communication with the other ink ejection port, each ink ejecting member being positioned in a respective first part so that when the ink ejecting member is displaced towards the roof, ink is ejected from the first part and when the ink ejecting member is displaced away from the roof, ink is ejected from the second part.

7. A printhead chip as claimed in claim 6, in which the substrate defines a plurality of inlet channels in fluid communication with respective first parts of the nozzle chambers.

* * * * *